US011068848B2

(12) United States Patent
Grover et al.

(10) Patent No.: US 11,068,848 B2
(45) Date of Patent: Jul. 20, 2021

(54) ESTIMATING EFFECTS OF COURSES

(71) Applicant: Microsoft Technology Licensing, LLC, Redmond, WA (US)

(72) Inventors: Aman Grover, Sunnyvale, CA (US); Siyu You, Santa Clara, CA (US); Krishnaram Kenthapadi, Sunnyvale, CA (US); Parul Jain, Cupertino, CA (US); Fedor Vladimirovich Borisyuk, Sunnyvale, CA (US); Christopher Matthew Degiere, Palo Alto, CA (US); Songtao Guo, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 968 days.

(21) Appl. No.: 14/814,403

(22) Filed: Jul. 30, 2015

(65) Prior Publication Data

US 2017/0032323 A1    Feb. 2, 2017

(51) Int. Cl.
*G06Q 10/10*    (2012.01)
*G06Q 50/20*    (2012.01)

(52) U.S. Cl.
CPC ..... *G06Q 10/1053* (2013.01); *G06Q 50/2057* (2013.01)

(58) Field of Classification Search
CPC .. G06Q 50/01; G06Q 10/06393; G06Q 10/10; G06Q 10/1053; G06Q 10/105; G06Q 50/2057
See application file for complete search history.

(56) References Cited

U.S. PATENT DOCUMENTS 7,444,309 B2    10/2008    Branke et al.
8,655,794 B1*    2/2014    Cobb ................ G06Q 10/1053
                                                         705/321

(Continued)

OTHER PUBLICATIONS

Z. Hu, R. Moh'd and A. Shboul, "The Application of Ant Colony Optimization Technique (ACOT) for Employees Selection and Training," 2009 First International Workshop on Database Technology and Applications, Wuhan, China, 2009, pp. 497-502, doi: 10.1109/DBTA.2009.172 (Year: 2009).*

(Continued)

*Primary Examiner* — Lynda Jasmin
*Assistant Examiner* — Maame Ofori-Awuah
(74) *Attorney, Agent, or Firm* — Schwegman Lundberg & Woessner, P.A.

(57) ABSTRACT

A member profile including a vector containing a field for each of a plurality of skills and a rating of one or more of the skills in the vector for a member of a social networking service is obtained. A first distance indicating a vector distance between the vector of the member profile and a vector of a hypothetical member profile representing the perfect job candidate is obtained. A hypothetical member profile for the member is created by combining the vector of the member profile with the indication of how each of the one or more skills is improved through taking the course from course information. A second distance between the member and the hypothetical perfect candidate for the job is obtained, and the difference between the first distance and the second distance is calculated to determine an estimate of how much the course will increase the member's job chances.

20 Claims, 10 Drawing Sheets

(56) References Cited

U.S. PATENT DOCUMENTS

| | | | |
|---|---|---|---|
| 2005/0278597 A1* | 12/2005 | Miguelanez | G01R 31/31707 714/738 |
| 2008/0086366 A1 | 4/2008 | Concordia et al. | |
| 2009/0204470 A1 | 8/2009 | Weyl | |
| 2012/0215795 A1 | 8/2012 | Phelon et al. | |
| 2013/0096991 A1* | 4/2013 | Gardner | G06Q 10/06 705/7.42 |
| 2013/0326009 A1 | 12/2013 | Morgan et al. | |
| 2014/0082021 A1 | 3/2014 | Hendrey | |
| 2014/0122355 A1* | 5/2014 | Hardtke | G06Q 10/105 705/321 |
| 2014/0172732 A1* | 6/2014 | Baladi | G06Q 10/1053 705/321 |
| 2014/0207712 A1 | 7/2014 | Gonzalez Diaz et al. | |
| 2014/0279632 A1* | 9/2014 | Andersen | G06Q 10/1053 705/321 |
| 2014/0324721 A1 | 10/2014 | Rennison et al. | |
| 2015/0088774 A1* | 3/2015 | Ortiz, III | G06Q 10/1053 705/321 |
| 2015/0120593 A1* | 4/2015 | Madhavan | G06Q 10/1053 705/321 |
| 2015/0161567 A1* | 6/2015 | Mondal | G06Q 10/1053 705/321 |
| 2015/0242815 A1* | 8/2015 | Velasco | H04W 4/21 705/321 |
| 2016/0260064 A1 | 9/2016 | Ahmed et al. | |
| 2016/0342906 A1 | 11/2016 | Shaashua et al. | |
| 2017/0032322 A1 | 2/2017 | Grover et al. | |
| 2017/0032324 A1 | 2/2017 | Grover et al. | |

OTHER PUBLICATIONS

"U.S. Appl. No. 14/814,397, Response filed Jan. 30, 2018 to Non Final Office Action dated Dec. 29, 2017", 10 pgs.

"U.S. Appl. No. 14/814,397, Non Final Office Action dated Dec. 29, 2017", 10 pgs.

"U.S. Appl. No. 14/814,397, Examiner Interview Summary dated Feb. 8, 2018", 3 pgs.

"U.S. Appl. No. 14/814,397, Examiner Interview Summary dated Aug. 10, 2018", 3 pgs.

"U.S. Appl. No. 14/814,397, Final Office Action dated Jun. 1, 2018", 10 pgs.

"U.S. Appl. No. 14/814,397, Response filed Aug. 7, 2018 to Final Office Action dated Jun. 1, 2018", 11 pgs.

"U.S. Appl. No. 14/814,405, Non Final Office Action dated Apr. 16, 2018", 32 pgs.

"U.S. Appl. No. 14/814,405, Response filed Jul. 16, 2018 to Non Final Office Action dated Apr. 16, 2018", 13 pgs.

"Applicant Initiated Interview Summary in U.S. Appl. No. 14/814,397", dated Dec. 13, 2018, 3 Pages.

"Non Final Office Action Issued in U.S. Appl. No. 14/814,397", dated Oct. 18, 2018, 12 Pages.

"Final Office Action Issued in U.S. Appl. No. 14/814,405", dated Nov. 16, 2018, 46 Pages.

"Appeal Brief Filed in U.S. Appl. No. 14/814,397", dated Aug. 27, 2019, 19 Pages.

"Final Office Action Issued in U.S. Appl. No. 14/814,397", dated Apr. 17, 2019, 10 Pages.

"Pre-Appeal Brief Filed in U.S. Appl. No. 14/814,397", dated Jul. 1, 2019, 5 Pages.

"Final Office Action Issued in U.S. Appl. No. 14/814,405", dated Nov. 26, 2019, 61 Pages.

"Non Final Office Action Issued in U.S. Appl. No. 14/814,405", dated Jul. 5, 2019, 49 Pages.

"Examiner's Answer Issued in U.S. Appl. No. 14/814,397", dated Feb. 18, 2020, 13 Pages.

* cited by examiner

ESTIMATING EFFECTS OF COURSES

TECHNICAL FIELD

The present disclosure generally relates to computer technology for solving technical challenges involved in Internet technology. More specifically, the present disclosure relates to the estimation of the effect of courses.

BACKGROUND

The rise of the Internet has given rise to two disparate phenomena: the increase in presence of social networks, with their corresponding member profiles being visible to large numbers of people, and the increase in the presence of job postings being placed online and viewable to large numbers of people. In some instances, these disparate phenomena have been growing more and more linked as companies develop ways to link job postings to social network profiles. For example, tools are available for corporate recruiters to search and filter member profiles on social networks to identify potential candidates (that the recruiters then reach out to in an attempt to get them to apply for the job). Likewise, tools are available on social networking services for members to search and filter job postings.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
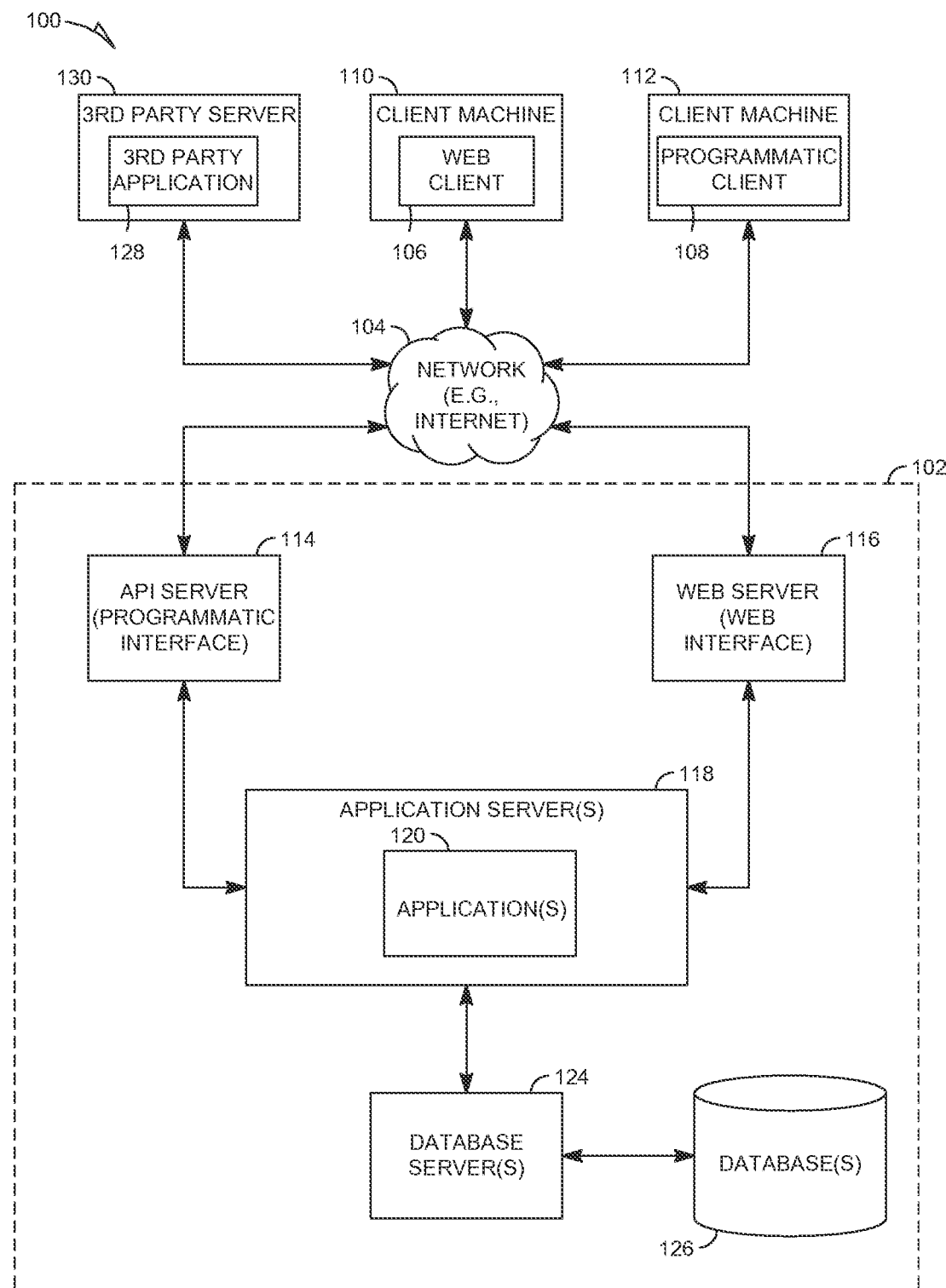
FIG. 1 is a block diagram illustrating a client-server system, in accordance with an example embodiment.

The present disclosure describes, among other things, methods, systems, and computer program products, which individually provide functionality for speeding data access. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

While existing tools provide mechanisms to allow members or recruiters to connect appropriate members profiles in social networking services to job postings and vice-versa, what is lacking is any way to determine with accuracy what the odds are that a particular member will actually be able to obtain a particular job. The tools available rely on a user on either end of the analysis (the recruiter/corporate-side or the member side) to use their own method of searching and filtering what they feel are appropriate matches. Unfortunately, this proves unreliable because each side has an incentive to be more inclusive at the expense of accuracy. A recruiter, for example, is incentivized to attempt to recruit any member who meets the most basic prerequisites for the job, regardless of whether that member has a 90% chance of obtaining the job, or a 2% chance of obtaining the job. Likewise, a member is incentivized to attempt to locate job postings for any job that he or she has a chance of obtaining whether or not that chance is actually good.

While this level of inaccuracy may not be harmful in the case of a job search, where oftentimes all that is lost from incorrectly matching a job posting with a member is wasted time, there are instances where the harm is more tangible. A member may incorrectly determine, for example, that taking a specialized course or obtaining a particular accreditation or degree may significantly increase the member's chance of obtaining a particular job. In cases where that assumption is incorrect, the member may waste both time and significant amounts of money taking the specialized course or Obtaining the accreditation or degree. Since this is largely not a black and white issue, a more concrete and tangible mechanism to measure a member's chances of obtaining a job in a job posting (with and without the additional coursework) would significantly improve these aspects. There may be instances where, for example, taking a particular course would increase the member's chances to obtain a particular job, but only by a little, and that course may be very expensive in money and/or time. A different course, on the other hand, might have an even greater positive effect on the member's chances of obtaining the job, while costing the same amount. Thus, a mechanism to be able to measure the chances of a member being able to obtain a particular job, both with the member's current qualifications and with various different hypothetical additions to the member's qualifications, would help increase efficiency in a computer system recommending particular actions be taken by members.

In an example embodiment, a machine learning system is utilized that computes a score that provides a quantitative measurement of the likelihood that a particular member will obtain a particular job if desired. This score is termed the "distance." The distance may be utilized in various ways and at various times, some of which will be described in more detail below.

In an example embodiment, the distance is calculated by first creating a perfect candidate for a job. The machine learning system creates virtual candidates/members that are hypothetical "perfect fits" for the jobs in the ecosystem. For a particular job, this perfect candidate can be used to find a similarity score between the perfect candidate and the candidate being measured (the candidate who may be interested in the job). The similarity score can be calibrated using some contextual adjustment features. A distance is then generated from the similarity score.

FIG. 1 is a block diagram illustrating a client-server system 100, in accordance with an example embodiment. A networked system 102 provides server-side functionality via a network 104 (e.g., the Internet or wide area network (WAN)) to one or more clients. FIG. 1 illustrates, for example, a web client 106 (e.g., a browser) and a programmatic client 108 executing on respective client machines 110 and 112.

An application program interface (API) server 114 and a web server 116 are coupled to, and provide programmatic and web interfaces respectively to, one or more application servers 118. The application server(s) 118 host one or more applications 120. The application server(s) 118 are, in turn, shown to be coupled to one or more database servers 124 that facilitate access to one or more database 126. While the application(s) 120 are shown in FIG. 1 to form part of the networked system 102, it will be appreciated that, in alternative embodiments, the application(s) 120 may form part of a service that is separate and distinct from the networked system 102.

Further, while the client-server system 100 shown in FIG. 1 employs a client-server architecture, the present disclosure is, of course, not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the application(s) 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications 120 of the networked system 102.

In some embodiments, any website referred to herein may comprise online content that may be rendered on a variety of devices including, but not limited to, a desktop personal computer, a laptop, and a mobile device (e.g., a tablet computer, smartphone, etc.). In this respect, the any of these devices may be employed by a user to use the features of the present disclosure. In some embodiments, a user can use a mobile app on a mobile device (any of machines 110, 112 and third party server 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
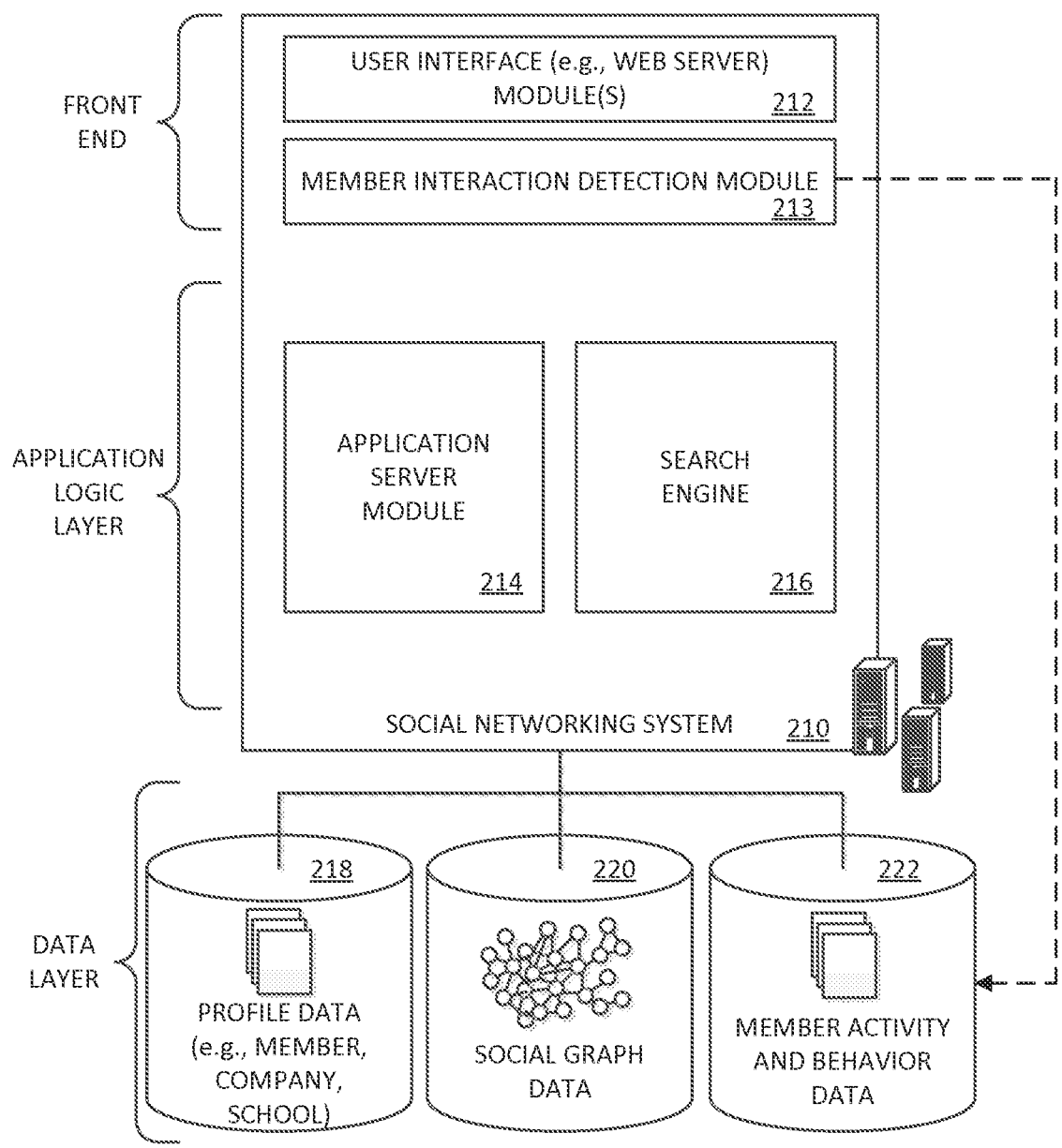
FIG. 2 is a block diagram showing the functional components of a social networking service, including a data processing module referred to herein as a search engine, for use in generating and providing search results for a search query, consistent with some embodiments of the present disclosure.

In some embodiments, the networked system 102 may comprise functional components of a social networking service. FIG. 2 is a block diagram showing the functional components of a social networking service, including a data processing module referred to herein as a search engine 216, for use in generating and providing search results for a search query, consistent with some embodiments of the present disclosure. In some embodiments, the search engine 216 may reside on application server(s) 118 in FIG. 1. However, it is contemplated that other configurations are also within the scope of the present disclosure.

As shown in FIG. 2, a front end may comprise a user interface module (e.g., a web server 116) 212, which receives requests from various client computing devices, and communicates appropriate responses to the requesting client devices. For example, the user interface module(s) 212 may receive requests in the form of Hypertext Transport Protocol (HTTP) requests, or other web-based, application programming interface (API) requests. In addition, a member interaction detection module 213 may be provided to detect various interactions that members have with different applications 120, services and content presented. As shown in FIG. 2, upon detecting a particular interaction, the member interaction detection module 213 logs the interaction, including the type of interaction and any meta-data relating to the interaction, in the member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications 120 and/or services provided by the social networking service.

As shown in FIG. 2, a data layer may include several databases, such as a database 218 for storing profile data, including both member profile data as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). With some embodiments, the profile data may be processed (e.g., in the background or offline) to generate various derived profile data. For example, if a member has provided information about various job titles the member has held with the same company or different companies, and for how tong, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation and, at least with some embodiments, does not require acknowledgement or approval by the member that is being followed. When one member follows another, the member who is following may receive status updates (e.g., in an activity or content stream) or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph in the social graph database 220.

As members interact with the various applications 120, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 2, by the member activity and behavior database 222. This logged activity information may then be used by the search engine 216 to determine search results for a search query.

In some embodiments, databases 218, 220, and 222 may be incorporated into database(s) 126 in FIG. 1. However, other configurations are also within the scope of the present disclosure.

Although not shown, with some embodiments, the social networking system 210 provides an application programming interface (API) module via which applications 120 and services can access various data and services provided or maintained by the social networking service. For example, using an API, an application may be able to request and/or receive one or more navigation recommendations. Such applications 120 may be browser-based applications 120, or may be operating system-specific. In particular, some applications 120 may reside and execute (at least partially) on one or more mobile devices (e.g., phone, or tablet computing devices) with a mobile operating system. Furthermore, while in many cases the applications 120 or services that leverage the API may be applications 120 and services that are developed and maintained by the entity operating the social networking service, other than data privacy concerns, nothing prevents the API from being provided to the public or to certain third-parties under special arrangements, thereby making the navigation recommendations available to third party applications 120 and services.

Although the search engine 216 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when indexing member profiles, forward search indexes are created and stored. The search engine 216 facilitates the indexing and searching for content within the social networking service, such as the indexing and searching for data or information contained in the data layer, such as profile data (stored, e.g., in database 218), social graph data (stored, e.g., in database 220), and member activity and behavior data (stored, e.g., in database 222). The search engine 216 may collect, parse, and/or store data in an index or other similar structure to facilitate the identification and retrieval of information in response to received queries for information. This may include, but is not limited to, forward search indexes, inverted indexes, N-gram indexes and so on.

Figure 3:
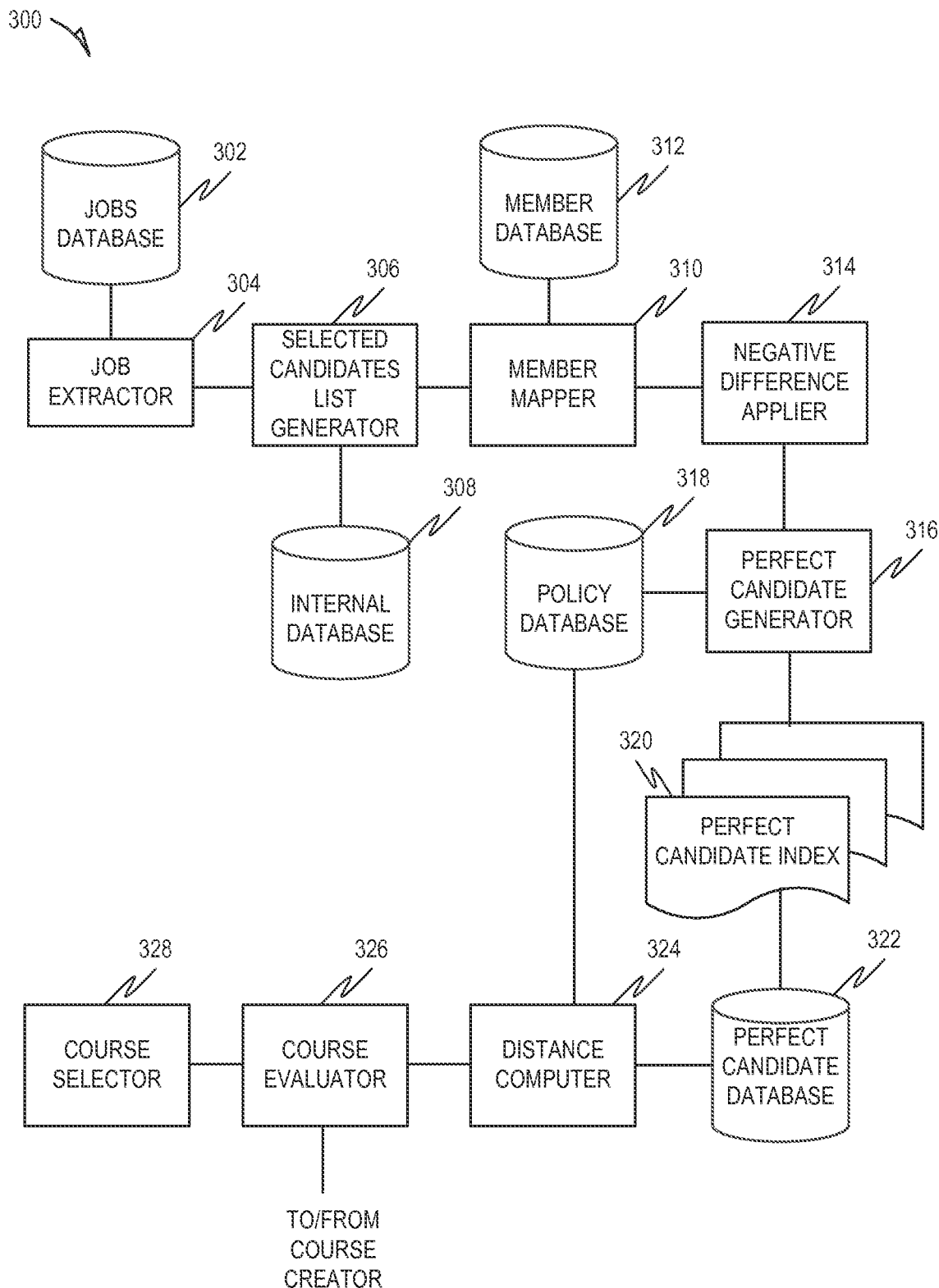
FIG. 3 is a block diagram illustrating a system for generating a member to job posting distance in accordance with an example embodiment.

FIG. 3 is a block diagram illustrating a system 300 for generating a member to job posting distance in accordance with an example embodiment. A jobs database 302 contains data regarding a plurality of different available jobs. The data may be defined via one or more job postings collected by a job posting service. In an example embodiment, the job posting service is part of a social networking platform but, in other embodiments, the job posting service may be separate and distinct from a social networking platform.

A job extractor 304 extracts the data about the jobs from the job database 302. This extracted data includes, at the least, key information about basic prerequisites for the job. Oftentimes, this information will be explicitly specified in the text of a job listing. For example, a job listing may require a minimum of 3 years of experience in Java programming and a Bachelor of Science in Computer Science. These prerequisites may be used later when attempting to generate a perfect candidate for the job.

A selected candidates list generator 306 may take the extracted job data and obtain information about successful candidates for the job from an internal database 308. The internal database 308 may be operated by, for example, the company that the job relates to (i.e., the company whom the candidate works for when hired). Alternatively, the internal database 308 may be operated by a third party, such as a recruiting service. This may be performed in a number of different ways. 111 an example embodiment, thresholds/filters are established in order to select the most relevant candidates. For example, a time filter may be applied such that only candidates who obtained the job in the last N months or years are selected, with N being configurable. Other filters or policies could be applied to aid in this selection process. In some example embodiments, a current job posting may not correlate completely with previous job postings but may have a strong similarity. For example, previous job postings may have been for a mobile interface design manager position but a reorganization may have shifted responsibilities for that position to a general user interface design manager position. One or more policies may be used to recognize that the general user interface design manager position includes responsibilities related to a prior mobile interface design manager position and obtain prior successful candidates to the mobile interface design manager position as being relevant successful candidates for the general user interface design manager position.

One of the goals of this system is to map each of the successful candidates to a member profile of the social networking service, which will help later in the generating of the perfect candidate for each job. In some instances, this mapping is fairly straightforward. For example, in some cases, the internal database 308 may contain information about a particular candidate's social networking member profile. This can commonly occur if, for example, the candidate submitted a resume with a link to the candidate's member profile. It may be more complicated, however, in cases where there is no explicit link between the candidate and a member profile.

In cases where the member profile isn't explicitly specified in the information from the internal database 308, a member mapper 310 may select a corresponding member profile in the member database 312 based on a matching algorithm that uses various fields (called "features") of metadata found in the data from the internal database 308, such as name, email address, etc. to determining the closest matching member profile in the member database 312. In an example embodiment, the system may identify email addresses in the metadata and use a mapping of email addresses to member identifiers stored in the member database 312 to map that selected candidate to the appropriate member identifier. If that is unsuccessful (for example, if no email address is found in the metadata pertaining to the selected candidate or if an email address in the metadata pertaining to the selected candidate has no corresponding match in the mapping), then the system may look to names (e.g., first name and last name) in the metadata pertaining to the selected candidate. Character-based hi-grams may be formed (where space is not a character) from the names in the metadata to match with names in the social network profiles in the member database 312. If this is unsuccessful, then the system may look to other features in the metadata. Word based n-grams can be formed from the other features in the metadata to match corresponding features in the social network profiles.

In an example embodiment, for each of these fields, a similarity match may be performed. In an example embodiment, this may be a cosine similarity match. A set of the highest rated matches could then be returned. The set size is customizable and may be between 1 and any other positive integer.

In an example embodiment, a minimum number of matches is set such that if the set returned via the cosine similarity using one field has a size less than the minimum, additional matches may be retrieved by performing a matching algorithm on another field.

In an example embodiment, the matching for each of these fields may be performed in parallel.

In an example embodiment, a feature score is generated for one or more of the above features for each of a number of different member profiles. This may be performed by calculating the feature score:

$$f_s = \frac{S_1 \cap S_2}{S_1 \cup S_2}$$

where $f_s$ is the feature score for the particular feature, $S_1$ is the set of all n-grams of the data corresponding to the feature in the metadata for the selected candidate, and $S_2$ is the set of all n-grams of the data corresponding to the feature in the social network profile in the member database 312.

Thus, if name (first name and last name) is considered a feature, then the feature score for first name and last name is equal to the intersection of all n-grams (in the case of first name and last name, character hi-grams) of names in the metadata and the set of all n-grams of names in the social network profile, divided by the union of those two sets. Likewise, if city of residence is considered a feature, then the feature score for city of residence is equal to the intersection of all n-grams of titles in the metadata and the set of all n-grams of cities of residence in the social network profile, divided by the union of those two sets. Similar calculations can be used for other features.

In the case where multiple feature scores are used, the feature scores can be weighted to derive an overall importance of the feature score. For example, name may be weighted higher than city of residence when trying to determine a match.

In an example embodiment, rather than examine all features in parallel, a first pass algorithm is used where only a single feature is examined in a first pass and then the remaining features are examined in a second pass. This helps speed the matching process in systems having large numbers of social network profiles. For example, in a first pass, only names may be examined, finding profiles having "matching" names (matching being defined as having a feature score above a certain threshold, in that it is not necessary that the exact name be matched). Then only those matching profiles are used to create the sets for the second pass examination of the remaining features.

The output of the member matcher is a set of member profiles corresponding to successful job candidates for a particular job. This may be fed to a negative difference applier 314. The negative difference applier 314 corrects for the fact that the skills, endorsements, or other features of a member profile may have changed over time since the member acquired the particular job. For example, a successful candidate for a particular position may have, subsequent to beginning work at the position, taken additional courses to obtain a particular additional certification. Since this occurred after the candidate had already been accepted for the job, it had no bearing on the candidate's ability to obtain the position. What is relevant is the snapshot of the candidate when the candidate applied for the job (or, at least, as close thereto as can be determined), and not any features of the member profile that have changed since then. The negative difference applier 314 uses past versions of the member profile stored in the member database 312 and metadata about the date the candidate had applied for the position from the internal database 308 (if available, and if not, a date reasonably close to that date, such as the date an offer for employment was extended or the date the candidate started at the position) to obtain a snapshot of the member profile on that date, including one of more features of the member profile that exist in the member profile on that date. In such embodiments, the prior versions of the member profiles may be date stamped as to when changes/updates occurred. The output of the negative difference applier 314 is the set of member profiles corresponding to successful candidate for a particular job, as of the date the candidate applied (or, as described above, as close thereto as can be determined).

This modified set of member profiles corresponding to successful candidates can then be passed to a perfect candidate generator 316. The perfect candidate generator 316 obtains one or more policies from a policy database 318 and applies the one or more policies to the features of each member profile in the modified set of member profiles corresponding to a particular job. The one or more policies define how features of the member profiles can be selected as being features of a hypothetical perfect candidate for the particular job. For example, one policy may state "union all skill sets and average out endorsements." Alternatively, a different policy could state "intersect all skill sets and take a median of all endorsements." In this context, the skill sets may be features describing particular skills contained in a member profile input to the perfect candidate generator 316. Endorsements may represent a number that indicates how many other members have endorsed the particular member associated with the member profile (e.g., by taking an explicit action of indicating an endorsement of that member). It should be note that the policies described here are general in nature but, in some example embodiments, the policies utilized could be more specific to the job or member profiles involved. For example, a job that is considered technical in nature may have a different set of policies than a job that is considered creative.

In an example embodiment, each member profile contains a vector of features (e.g., skills, endorsements) representing attributes of the corresponding member. The one or more policies may define how to create a vector representing the perfect candidate based on the vectors of the member profiles passed to the perfect candidate generator 316.

In an alternative embodiments, member profiles that have a same or similar current job title as the job opening, the same or similar job title and employer as the job opening, the same or similar job title as jobs similar to the job opening, and the same or similar job title and employer as jobs similar to the job opening are obtained. These member profiles are then aggregated by applying one or more policies, or by applying weights learned from, for example, a machine learning algorithm. Thus, the hypothetical perfect candidate is generated. distance However the policies are applied, the result is a perfect candidate index 320 created by the perfect candidate generator 316 executing the one or more policies from the policy database 318 on the member profiles output from the negative difference applier 314.

In an example embodiment, the perfect candidate index 320 for each job may be stored in a perfect candidate database 322 or otherwise persisted in long-term storage, along with an indication of the job corresponding to the perfect candidate index 320. At a later time, when a determination is desired as to a particular member's chances of obtaining a particular job, a distance computer 324 may extract the perfect candidate index 320 associated with the particular job and calculate a distance for the member/perfect candidate index pair. As described earlier, in one example embodiment, the distance is calculated by first determining a similarity score between the member and the perfect candidate index 320. This similarity score may be determined in a number of different ways, such as by cosine similarity, Jaccard similarity coefficient, etc. The similarity score can be determined with the aid of one or more policies for similarity score calculation, extracted from the policy database 318. The similarity score can then be calibrated using some contextual adjustment features. A distance is then generated from the similarity score using these calibrations.

Figure 4:
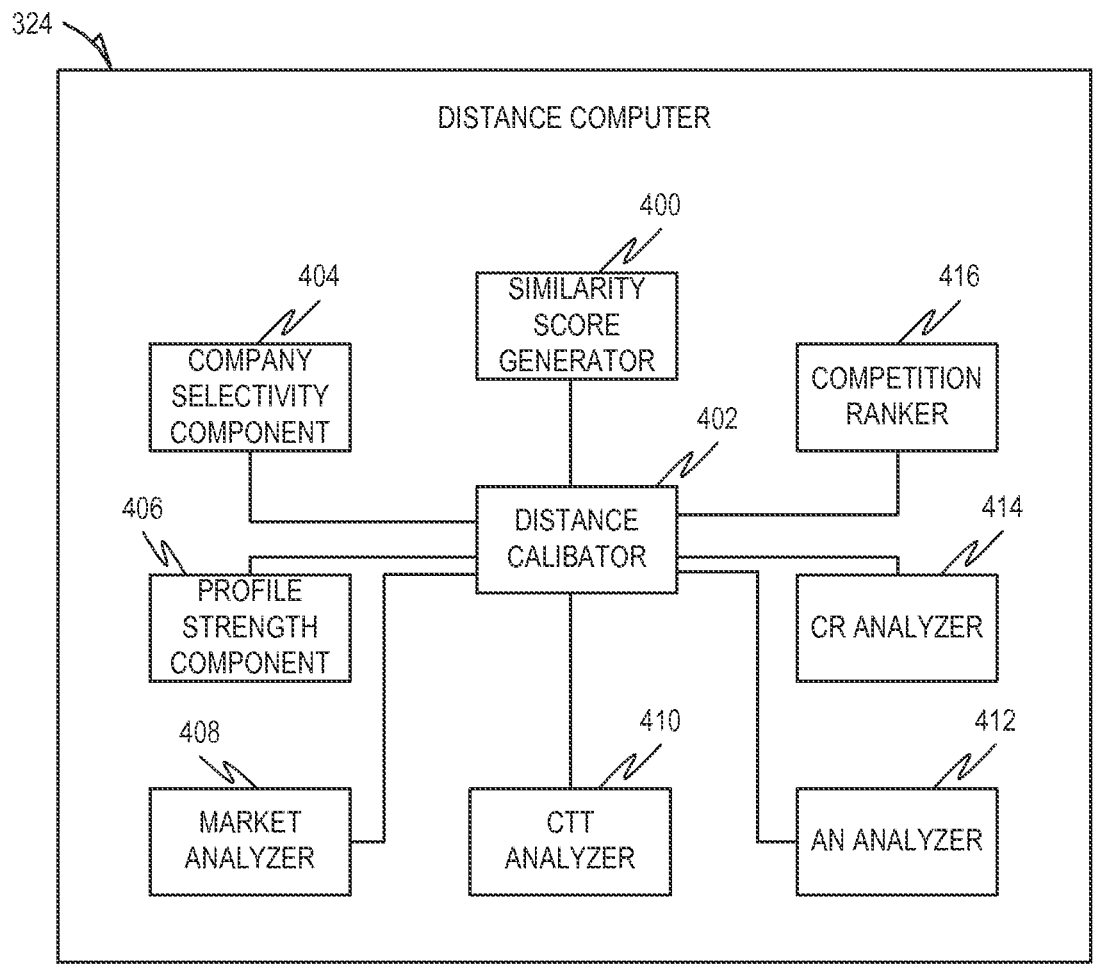
FIG. 4 is a block diagram illustrating a distance computer in more detail, in accordance with an example embodiment.

FIG. 4 is a block diagram illustrating a distance computer 324 in more detail, in accordance with an example embodiment. The distance computer 324 includes a similarity score generator 400, which generates a similarity score for a particular member/perfect candidate index pair based on one or more policies, as described above. The similarity score is then fed to a distance calibrator 402, which acts to calibrate the similarity score (into a distance) based on inputs from one or more calibration components. Here, the calibration components include a company selectivity component 404, a profile strength component 406, a market analyzer 408, a conversion-to-target (CTT) analyzer 410, an alumni network (AN) analyzer 412, a conversion rate (CR) analyzer 414, and a competition ranker 416 although, in other embodiments, different calibration components may be present based on the desired attributes/factors used to calibrate the similarity score.

The company selectivity component 404 may analyze current metrics on how selective the company associated with the particular job currently is and output information about the amount of selectivity to the distance calibrator 402, which can then calibrate the similarity score based on this company selectivity. For example, the company selectivity component 404 may determine that a company, in general, has gotten more selective with its hiring recently, and therefore may calibrate the particular members similarity to the perfect candidate index 320 downwards, on the assumption that the perfect candidate index 320 may have been determined based on candidates who applied before the company became more selective. The company selectivity component 404 may use a variety of inputs in making this determination. In one example embodiment, the company explicitly provides company selectivity information to the company selectivity component 404, such as by uploading recent hiring statistics on a periodic basis. In another example embodiment, the company selectivity component 404 may perform its own analysis of recent hiring by examining member profiles in the profile database 312 of candidates who recently applied for jobs at the particular company, or by searching third party databases (such as news articles or social media postings) to deduce company selectivity information.

The profile strength component 406 analyzes the overall strength of the member profile and outputs information about this overall profile strength to the distance calibrator 402, which can then calibrate the similarity score based on the profiles strength. In an example embodiment, the profile strength is based on how active the member is in updating their profile. Profiles that are updated more recently and more frequently are considered to be of higher strength. In another example embodiment, the profile strength component 406 may determine that a particular profile is strong because the candidate has many skills in many different and disparate areas. With the assumption that such "generalists" may be more likely to obtain positions than people who only have skills in the specific areas related to the job at hand, the distance calibrator 402 can adjust a particular member's similarity score upwards or downwards based on the overall strength or weakness of their profile.

The market analyzer 408 may analyze company sentiment and output information about the company sentiment to the distance calibrator 402, which can then calibrate the similarity score based on the company sentiment. The company sentiment can be determined from, for example, news articles and social networking postings indicating general shifts in how the company fat which the job pertains) is viewed by the public. News items such as mass layoffs or corporate scandals can lead to a negative sentiment that can then cause the distance calibrator 402 to adjust the similarity score downwards, under the assumption that the perfect candidate index 320 may have been determined based on candidates who applied before the company grew in negative sentiment. The market analyzer 408 may also analyze the industry as a whole using the same inputs. For example, the market analyze 408 may determine that the semiconductor industry has been struggling, which may lead the distance calibrator 402 to adjust the similarity score downwards to reflect the reduced chances that the candidate will receive a job offer.

The CTT analyzer 410 determines the conversion rate of people with similar profiles that got the job and outputs information about this conversion rate to the distance calibrator 402, which can then calibrate the similarity score based on the conversion rate. This may include an analysis of members who worked at the same position at a different company who then obtained that same position at the present company.

The AN analyzer 412 then analyzes the alumni network of the member profile and outputs information about the strength of the alumni to the distance calibrator 402, which can then calibrate the similarity score based on the strength of the alumni network. The strength of the alumni network may be measured on a general scale (e.g., how many alumni of the same school(s) are working generally in the profession) or on a more specific scale (e.g., how many alumni of the same school are working at the particular company).

The conversion rate (CR) analyzer 414 may analyze the particular member's conversion rate (rate of jobs applied for in relation to jobs offered) and output information about this conversion rate to the distance calibrator 402, which can then calibrate the similarity score based on the conversion rate. Thus, the distance calibrator 402 may, for example, increase the distance for a member who has in the past applied for jobs at a high rate of success.

The competition ranker 416 may analyze the other people competing for the same job (based on the profiles of other applications) and provide information about the competition to the distance calibrator 402, which can then calibrate the similarity score based on the competition. For example, if there is fierce competition for the job and the competing candidates are generally strong candidates, the distance calibrator 402 may adjust the similarity score downwards for a particular candidate to reflect the lower odds of successfully obtaining an offer for the job.

As described briefly above, machine teaming techniques may be applied to different areas of the system/method described above to improve reliability. For example, at the perfect candidate generation stage, the perfect candidate generator 316 may receive feedback in the form of indications of whether or not particular candidates actually received offers, and then may adjust the one or more policies it uses to determine the perfect candidate accordingly. For example, the perfect candidate generator 316 may first indicate that particular skills A, B, C, and D are key qualities of a perfect candidate, but then later receive feedback that a certain number of candidates who applied who had these key qualities did not receive offers, but candidates who had an added skill of E received a high percentage of offers. The perfect candidate generator 316 may then adjust the policies, not just for this particular job but potentially for other jobs as well based on this feedback as to its "performance".

Similarly, the distance computer 324 may also dynamically adjust the one or more policies it uses to compute the distance based on feedback of actual performance of candidates given a high distance. This may include, for example, adjusting general policies, adjusting the types of inputs received (such as which of the one or more calibration components 404-416 the distance calibrator 402 uses to calibrate the distance, and whether to access additional calibration components), as well as adjusting how each individual calibration component 404-416 analyzes its respective data, all based on the performance of the system in providing the distance. The less reliable the distance, as measured by actual performance, the more adjustments may be made.

Figure 5:
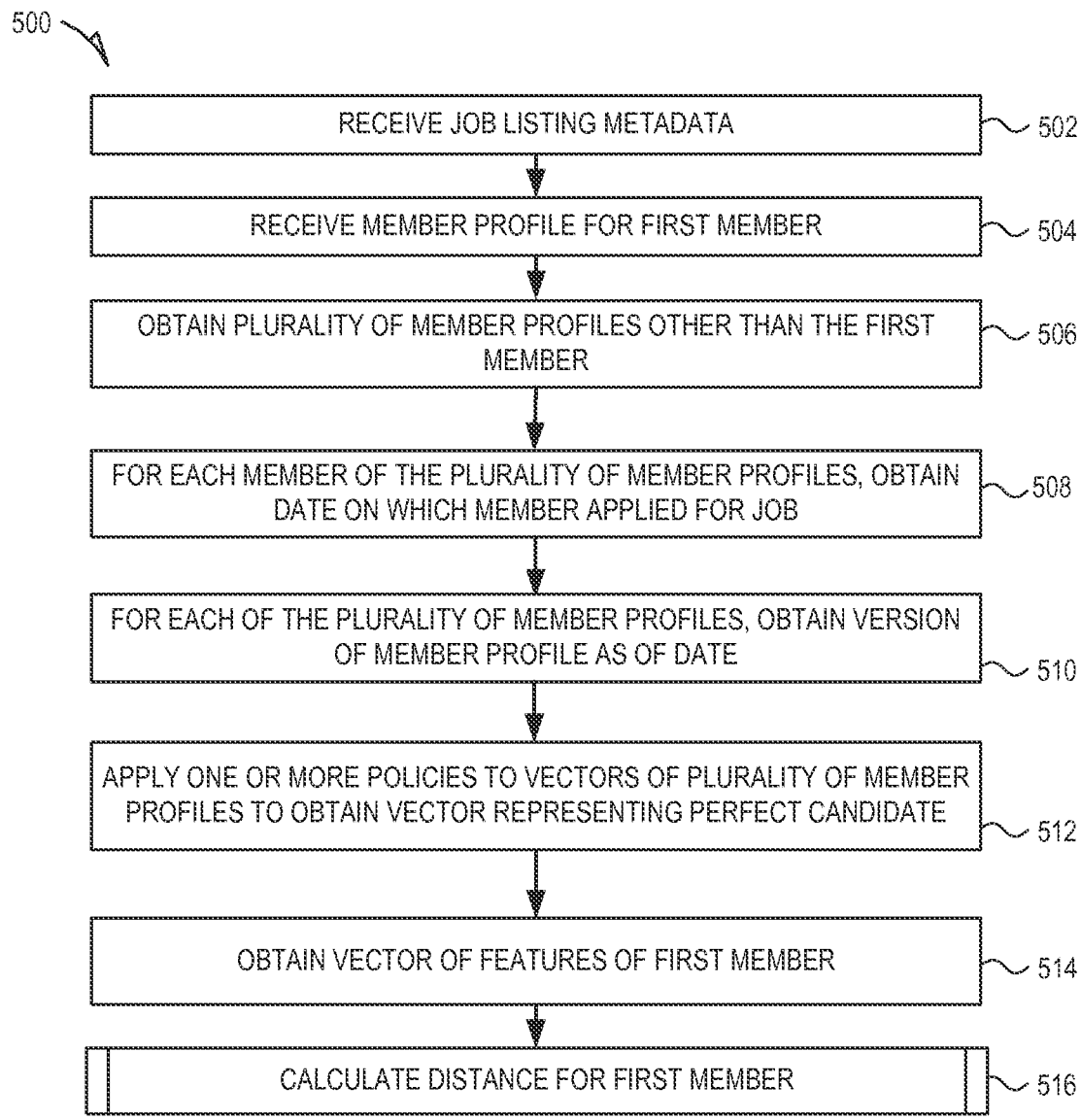
FIG. 5 is a flow diagram illustrating a method of determining a distance in accordance with an example embodiment.

FIG. 5 is a flow diagram illustrating a method 500 of determining a distance in accordance with an example embodiment. At operation 502, metadata pertaining to job listing data corresponding to a job opening is received. The metadata may include, for example, one or more requirements for the job opening. At operation 504, a member profile for a first member of a social networking service is received. At operation 506, a plurality of member profiles for members of the social networking service other than the first member are obtained. The plurality of member profiles may correspond to members who have applied for and obtained job offers for jobs similar to the job opening. The plurality of member profiles may be obtained by, for example, receiving information about successful candidates for jobs similar to the job opening and comparing the information about successful candidates to member profiles in a member database 312 to identify member profiles corresponding to the successful candidates.

At operation 508, for each of the plurality of member profiles, a date on which the corresponding member applied for the job similar to the job opening is obtained. It should be noted that the definition of "applied for" shall be interpreted broadly. In other words, this date may correspond to the date that the corresponding member first expressed interest in a job opening, first communicated with a recruiter or other designated contact for the company at which the job opening occurred, first submitted an application for the job opening, first sent a resume for the job opening, first conducted an interview for the job opening, or any other date associated with the member's activities with regards to the job opening. It should also be noted that this date may be an estimated date.

At operation 510, for each of the plurality of member profiles, a version of the corresponding member profile as it was on the date on which the corresponding member applied for the job similar to the job opening is obtained. Each of the versions of the corresponding member profiles include a vector of features of the corresponding member.

At operation 512, one or more policies are applied to the vectors for the plurality of member profiles to obtain a vector of features representing a perfect candidate for the job opening. At operation 514, a vector of features of the first member is obtained from the member profile for the first member.

At operation 516, a distance for the first member is calculated with respect to the perfect candidate for the job opening by comparing the vector of features representing the perfect candidate and the vector of features of the first member.

Figure 6:
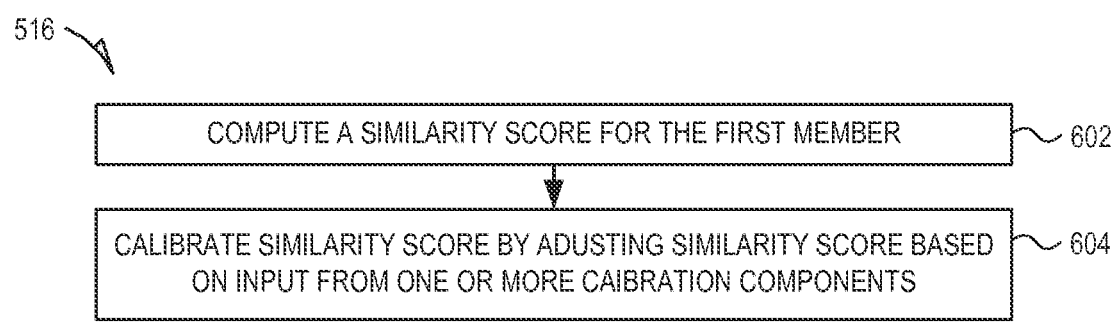
FIG. 6 is a flow diagram illustrating a method of calculating a distance for the first member in accordance with an example embodiment.

FIG. 6 is a flow diagram illustrating a method 516 of calculating a distance for the first member in accordance with an example embodiment. This method 516 represents one example embodiment of operation 516 in more detail. At operation 602, a similarity score for the first member with respect to the perfect candidate for the job opening is calculated. This may be calculated by, for example, performing a similarity algorithm to the vector of features representing the perfect candidate and the vector of features of the first member. This similarity algorithm may be, for example, a cosine similarity algorithm or a Jaccard similarity coefficient algorithm. At operation 604, the similarity score is calculated by adjusting the similarity score based on input from one or more calibration components. These calibration components are described in more detail above.

Once the calibrated distance for a particular member/perfect candidate index is known, the distance can also be used as an indication of the particular user's chances of obtaining the corresponding job. This may be used in a variety of different ways. In one example embodiment, the distance(s) may be used to recommend jobs to which to apply. For example, a particular member may be evaluated with respect to a number of different potential job openings, and distances for each pairing of this particular member with potential job opening may be calculated, selecting the X jobs having the highest distances to recommend to the user. In another example embodiment, the distance(s) can be displayed to the member, allowing the member to have direct knowledge of the member's chances of obtaining various jobs while browsing job listings, aiding in the member's decision of whether to apply. For example, a member may not wish to apply to any job if none of the job openings have a distance for the member higher than a particular threshold, as the member may not wish to waste their time.

In another example embodiment that will be described in more detail herein, the distance for a particular member/job opening is used to recommend one or more courses that the member can take to optimally improve the member's chances of obtaining the job. Referring back to FIG. 3, in this example embodiment, a course evaluator 326 is used to evaluate the effect that each of a plurality of courses would have on the particular member's distance. This effect may be quantified and used in, for example, aiding the recommendation of which courses the member should take to improve the member's chances of obtaining the job.

In one example embodiment, the course evaluator 326 may use information provided by the course creator or course sponsor regarding the skills added by taking the course. In one example embodiment, this may simply be a list of the skills improved by taking the course but, in other example embodiments, this information may also include an indication of the amount that member skill is increased by taking the course. For example, the course creator or sponsor may specify that a particular course adds 10 Hadoop endorsements, 5 Java endorsements, and 2 general programming endorsements.

In an example embodiment, the course evaluator 326 can provide some guidance to course creators or course sponsors as far as how to specify the information about the course. For example, the course evaluator 326 can identify similar courses that were offered in the past, based on, for example, similar text descriptions of the courses. The course evaluator 326 can then provide the information about how much those other courses increase member skills to the current course creator or course sponsor, which can then pattern their own information on the information about the other course. It should be noted that, while in one example embodiment, the course evaluator 326 simply provides the information about the other courses that the other course creators/sponsors provided, in other example embodiments, the course evaluator 326 actually evaluates the actual results of members who took those other courses and adjusts the information accordingly. For example, another course provider may have specified that their course increases a member's skills by 10 Hadoop endorsements, 5 Java endorsements, and 2 general programming endorsements, but an evaluation of the actual results of members taking this other course reveals that those members only had a very modest increase in their chances of obtaining jobs that required Hadoop skills (perhaps indicating that the other course did not increase the members' Hadoop skills as much as the course creator/sponsor thought, or at least that the course is not perceived by employers to have done so). As such, the course evaluator 326 may adjust the number of Hadoop endorsements provided by the other course downwards before presenting it to the current course creator/sponsor.

In another example embodiment, the course information is not provided by the course creator but instead the relevant courses are obtained using an information retrieval approach by querying external databases/websites containing the courses. In this alternative approach, the skills gap may be computed by determining missing skills for a member/job pair (e.g., similar to a distance score between the member profile and the hypothetical perfect candidate for the job). A small set of queries can then be formed by combining pairs of related (missing) skills, and they can be posed to a search engine to obtain relevant courses from a target content domain (such as a massive open online courses (MOOCs) database). The results of the queries can then be aggregated to identify relevant courses to address the skill gap.

Referring back to the initial embodiment, the course evaluator 326 then uses the information about the course itself to determine how much closer a particular member will get to the perfect candidate index 320 for the job if the particular member takes the course. This may be accomplished in a number of different ways. In a first example embodiment, the course evaluator 326 compares the distance for the particular user/job pair to a hypothetical distance for the particular member/job pair if the course was taken. As such, the course evaluator 326 sends the information about the effect the course has on a user profile to the distance computer 324, which adds this effect to the user profile obtained from the negative difference applier 314 and reevaluates the distance based on this new, hypothetical version of the user profile, which is output to the course evaluator 326. The course evaluator 326 then obtains the prior distance for this member/job pair from the distance computer 324 (or from a memory where the distance computer 324 saved the original distance). It then performs a comparison between the original distance for this member/job pair and the new distance for this member/job pair. The difference in these distances then can be used as an estimate of how much a particular course will increase the chances of a particular member obtaining a particular job. This process can be repeated for all the possible courses that a particular member can take, resulting in information that indicates how much each course actually affects the member's estimated chances of obtaining the job.

In another example embodiment, every member has a vector of skills, with each skill measured on some scale (e.g., a 1-10 scale). Each vector contains a field for each possible skill. A similar vector can be created for each course, with the impact the course has on each skill identified in the fields in the vector. This vector can be created for each course/member combination, and reflect the impact the course has on each skill of this particular member. These vectors could then be output to the distance computer 324 for use when evaluating the delta between the chances the member has of obtaining the job without the course versus with the course.

Figure 7:
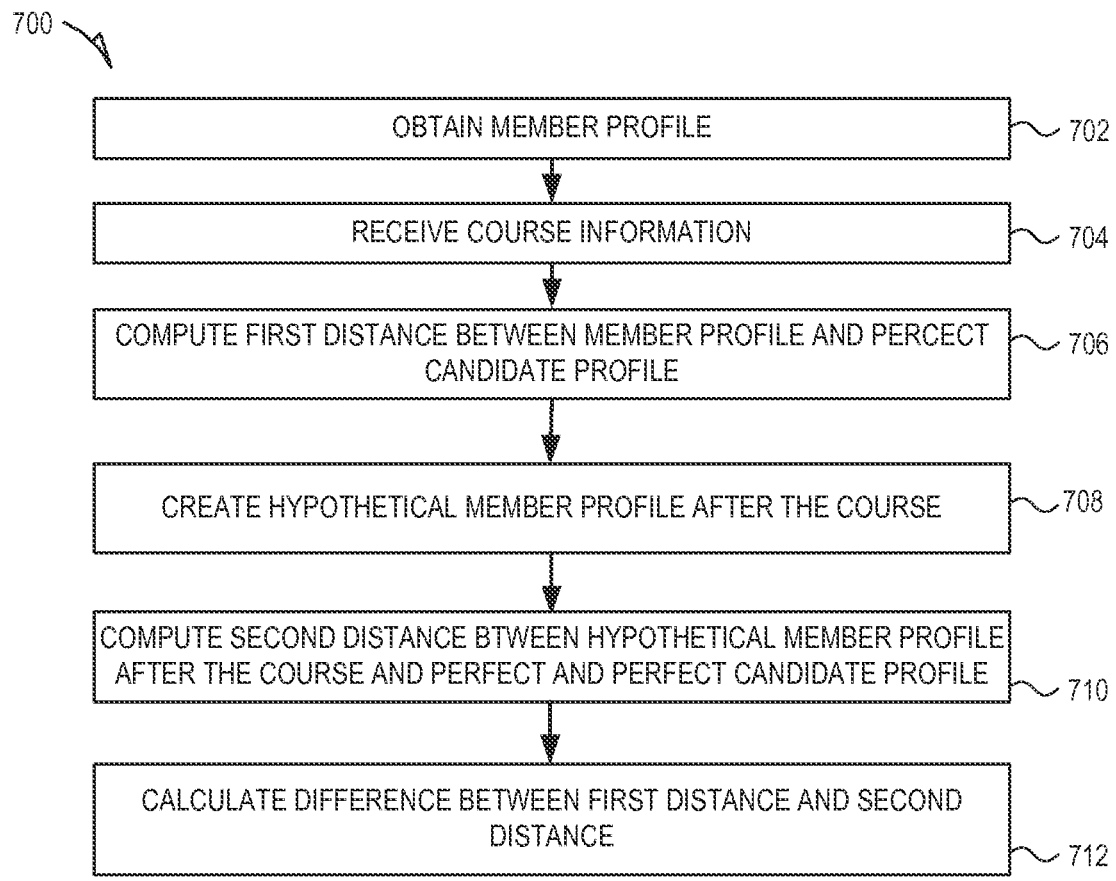
FIG. 7 is a flow diagram illustrating a method of measuring how much a course affects a member of a social networking service's chances of obtaining a particular job, in accordance with an example embodiment.

FIG. 7 is a flow diagram illustrating a method 700 of measuring how much a course affects a member of a social networking service's chances of obtaining a particular job, in accordance with an example embodiment. At operation 702, a member profile for a member of a social network is obtained from a member database 312. The member profile may include a vector containing a field for each of a plurality of skills and a rating of one or more skills in the vector. At operation 704, course information is received. The course information may include an identification of a course that members can take to improve one or more skills. The course information may also include an indication of how each of the one or more skills is improved through the taking of the course.

At operation 706, a first distance is computed for the member. The first distance indicates a vector distance between the vector of the member profile and a vector of a hypothetical member profile representing a perfect candidate for the job. At operation 708, a hypothetical member profile after the course for the member is created by combining the vector of the member profile with the indication of how each of the one or more skills is improved through the taking of the course from the course information.

At operation 710, a second distance is calculated for the member. The second distance indicates a vector distance between a vector of the hypothetical member profile after the course and the vector of the hypothetical member profile representing the perfect candidate for the job. At operation 712, a difference between the first distance and the second distance is calculated to determine an estimate of how much the course will increase a chance of the member obtaining the job.

Once the information is known about how much each course affects a particular member's chances of obtaining a particular job, this information could be used in a variety of different ways. In a first example embodiment, the member is informed of the particular increase in job chances of taking each particular course, perhaps presented alongside the course information when the member is browsing for possible courses to take. This allows the member to personally determine whether or not taking the course would be beneficial enough to warrant the time/cost.

In another example embodiment, an automatic algorithm to determine the best combination of courses for a member to take to increase the member's chances of obtaining a particular job, given the time and cost involved in each course, is provided. This automatic algorithm may be implemented by a course recommender mixer 322. While given unlimited time and money it would be most beneficial for the member to simply take every possible course, neither time nor money is an unlimited quantity. Thus, in an example embodiment, the time and cost of each course is identified and an analysis is undertaken to identify the courses or course combinations that maximizes the increase of the member's chances of obtaining the job while minimizing the time and cost. This is known as a subset selection problem. With large data sets, it may be difficult to solve this subset selection problem in real time. As such, various techniques may be utilized to help make this algorithm more efficient. In one example embodiment, various subsets may be pruned based on one or more thresholds. These thresholds may be set by a system administrator or a member. For example, the member may specify that he or she is only interested in course or course combinations that will increase the member's odds of obtaining the job to 90%, likewise, the member may specify that the member only has $5000 to spend on courses, or 100 hours of time to take the courses.

In another example embodiment, a heuristic approach may be used to identify the optimal course selections. For example, an evolutionary algorithm, which is a stochastic method where a global function is defined and whose value is attempted to be optimized by traversing the search space using a combination of rules and randomness. Examples of evolutionary algorithms include particle swarm optimization (PSO)-based approaches and genetic algorithms (GA). Thus, for example, a course is randomly selected and its effect on the combined variables of distance, time, and cost is measured, then another course is randomly selected to see if its effect is better or worse than the previous course, and so on.

It should be noted that, in some example embodiments, the effect of multiple courses taken together could be estimated by, for example, iteratively performing the course selection algorithm and the distance calculations for the hypothetical course/member pairings. For example, rather than the course evaluator 326 merely causing the calculation of the distance for each individual course separately (i.e., how much the chances the member has to land the job increase based on the individual course), this calculation can be performed on a combination of courses specified by the course selector 328 while it is performing the subset selection algorithm to determine the best combination of courses. Thus, for example, the course selector 328 could randomly group course A and course B together and then send this to the course evaluator 326 which may cause the reevaluation of the distance for the member/job pair if the member takes both course A and course B. The course selector 328 may then use this recalculated distance to determine whether to select the particular combination.

Figure 8:
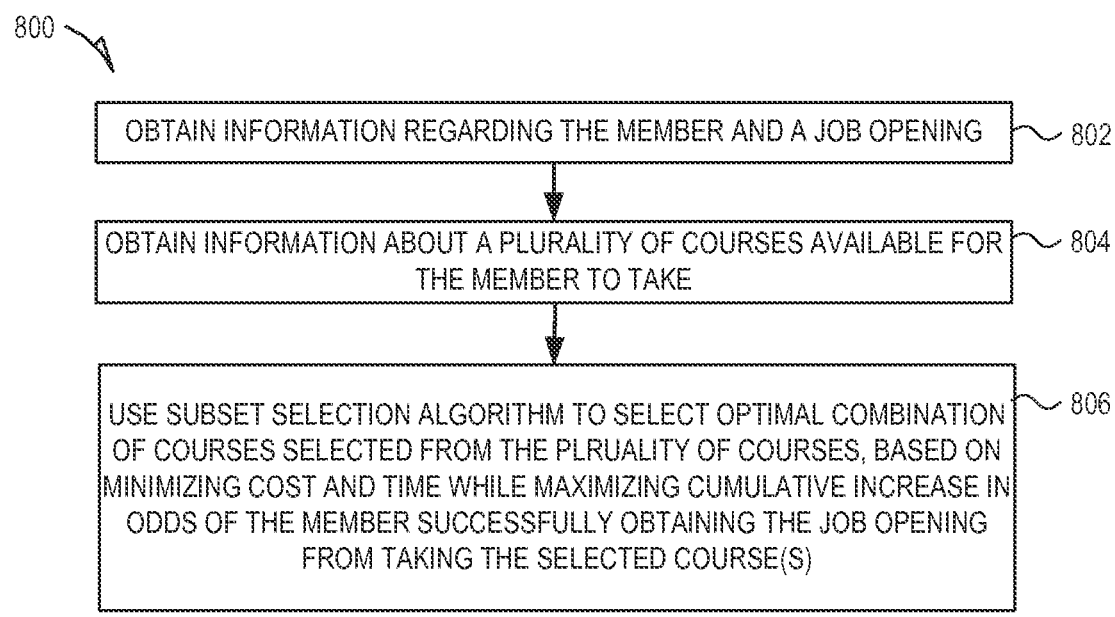
FIG. 8 is a flow diagram illustrating a method for deriving an optimal combination of courses for a member of a social networking service to take in order to obtain a job, in accordance with an example embodiment.

FIG. 8 is a flow diagram illustrating a method 800 for deriving an optimal combination of courses for a member of a social networking service to take in order to obtain a job, in accordance with an example embodiment. At operation 802, information regarding the member and a job opening are obtained. At operation 804, information about a plurality of courses available for the member to take is obtained. The information may include, for each course, cost, time, and vector including, for each of a plurality of skills identified in a member profile of the member, an effect of taking the corresponding course. At operation 806, a subset selection algorithm is used to select an optimal combination of courses selected from the plurality of courses, based on minimizing cost and time while maximizing cumulative increase in odds of the member successfully obtaining the job opening from taking the selected course(s).

Example Mobile Device

Figure 9:
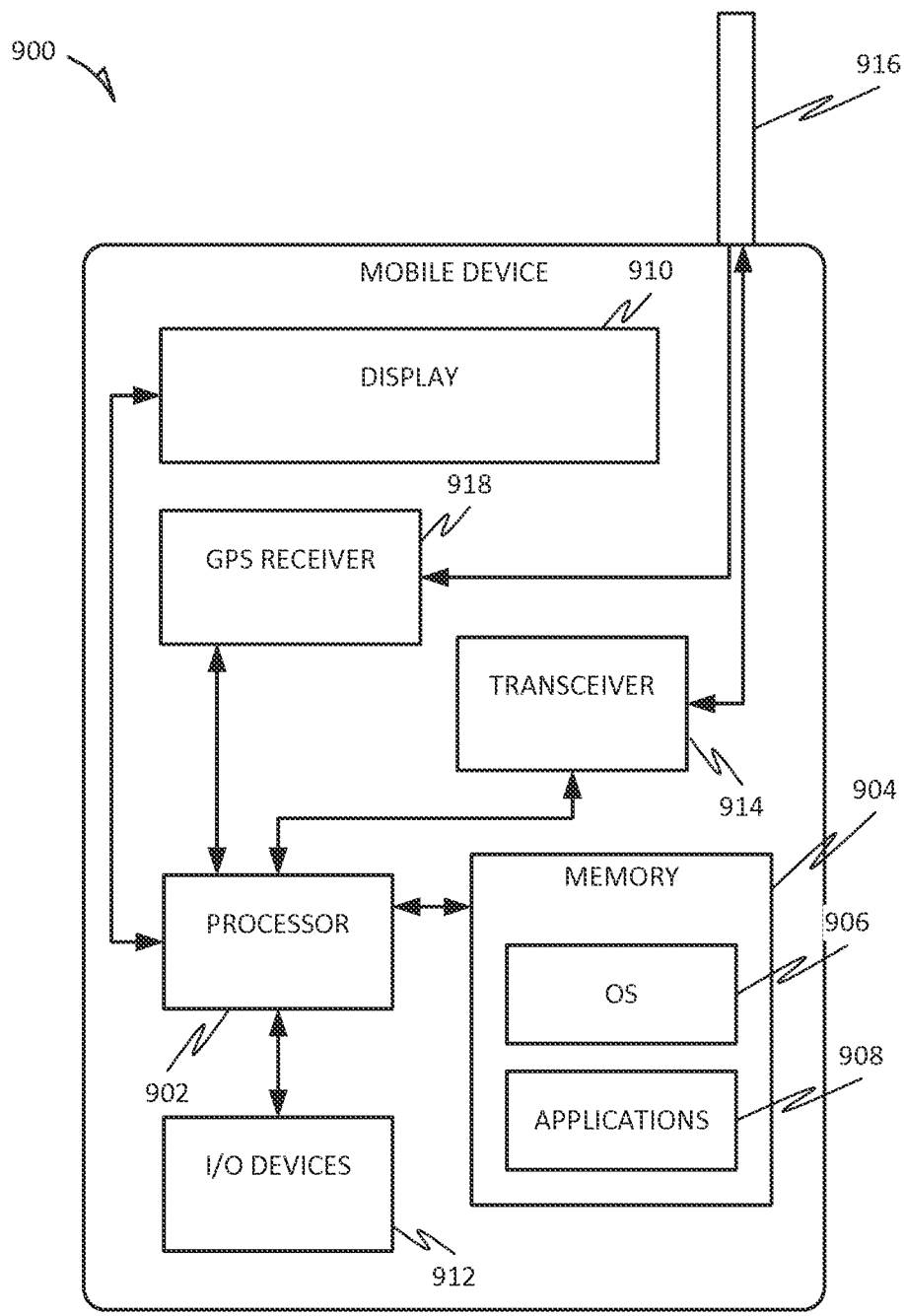
FIG. 9 is a block diagram illustrating a mobile device, according to an example embodiment.

FIG. 9 is a block diagram illustrating a mobile device 900, according to an example embodiment. The mobile device 900 can include a processor 902. The processor 902 can be any of a variety of different types of commercially available processors 902 suitable for mobile devices 900 (for example, an XScale architecture microprocessor, a microprocessor without interlocked pipeline stages (MIPS) architecture processor, or another type of processor 902). A memory 904, such as a random access memory (RAM), a flash memory, or another type of memory, is typically accessible to the processor 902. The memory 904 can be adapted to store an operating system (OS) 906, as well as application programs 908. The processor 902 can be coupled, either directly or via appropriate intermediary hardware, to a display 910 and to one or more input/output (I/O) devices 912, such as a keypad, a touch panel sensor, a microphone, and the like. Similarly, in some embodiments, the processor 902 can be coupled to a transceiver 914 that interfaces with an antenna 916. The transceiver 914 can be configured to both transmit and receive cellular network signals, wireless data signals, or other types of signals via the antenna 916, depending on the nature of the mobile device 900. Further, in some configurations, a GPS receiver 918 can also make use of the antenna 916 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 902 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 902 or other programmable processor 902) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 902 configured using software, the general-purpose processor 902 can be configured as different hardware-implemented modules at different times. Software can accordingly configure a processor 902, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 902 that are temporarily configured (e.g., by software) or permanently configured to perform the relevant operations. Whether temporarily or permanently configured, such processors 902 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 902 or processor-implemented modules. The performance of certain of the operations can be distributed among the one or more processors 902, not only residing within a single machine, but deployed across a number of machines. In some example embodiments, the processor 902 or processors 902 can be located in a single location (e.g., within a home environment, an office environment, or a server farm), while in other embodiments, the processors 902 can be distributed across a number of locations.

The one or more processors 902 can also operate to support performance of the relevant operations in a. "cloud computing" environment or as a "software as a service" (SaaS). For example, at least some of the operations can be performed by a group of computers (as examples of machines including processors 902), these operations being accessible via a network 104 (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 902, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network 104.

In example embodiments, operations can be performed by one or more programmable processors 902 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network 104. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 902), or in a combination of permanently and temporarily configured hardware can be a design choice. Below are set out hardware (e.g., machine) and software architectures that can be deployed, in various example embodiments.

Example Machine Architecture and Machine-Readable Medium

Figure 10:
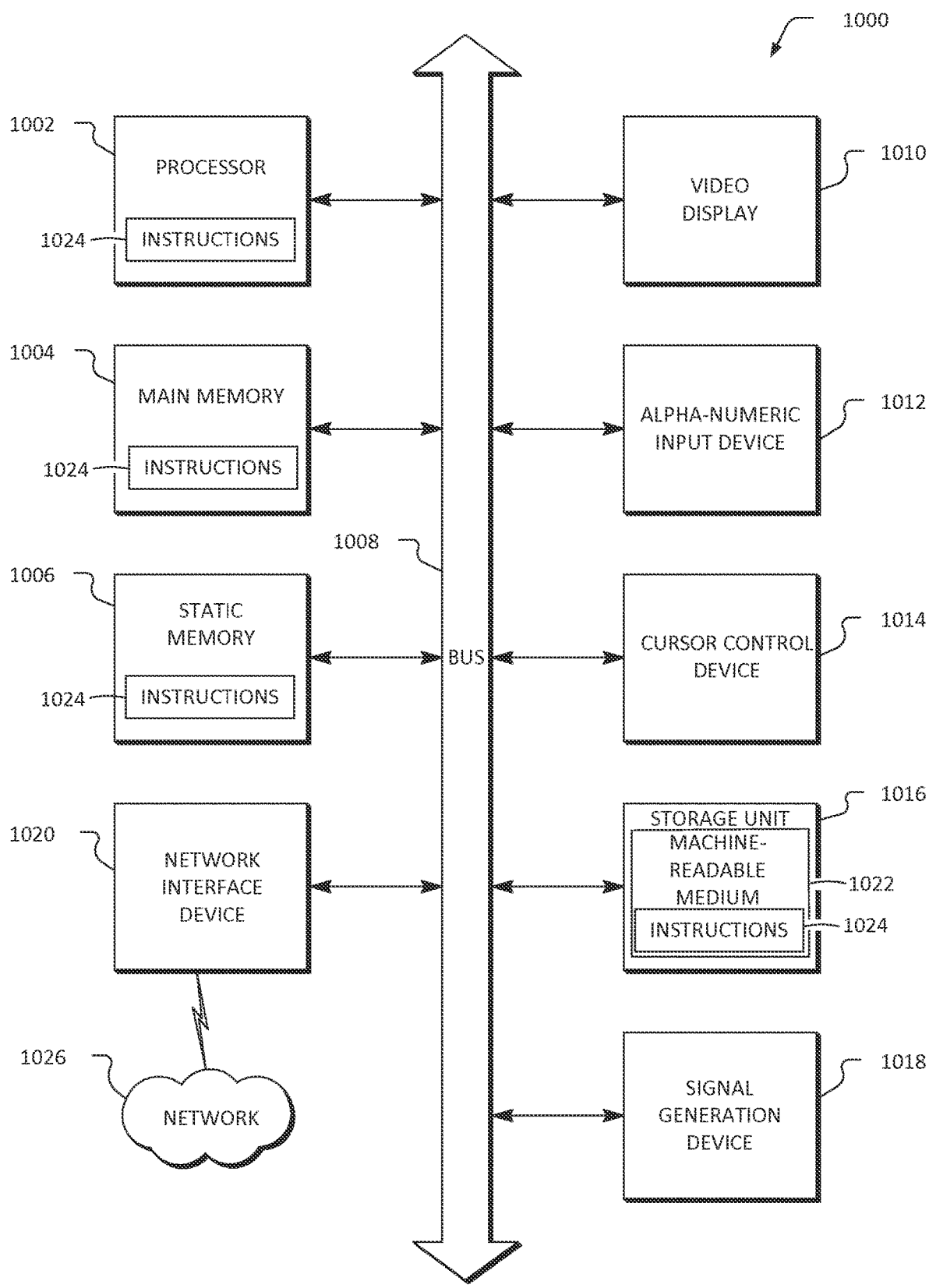
FIG. 10 is a block diagram of machine in the example form of a computer system within which instructions can be executed for causing the machine to perform any one or more of the methodologies discussed herein.

FIG. 10 is a block diagram of machine in the example form of a computer system 1000 within which instructions 1024 can be executed for causing the machine to perform any one or more of the methodologies discussed herein. In alternative embodiments, the machine operates as a stand-alone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute a set (or multiple sets) of instructions 1024 to perform any one or more of the methodologies discussed herein.

The example computer system 1000 includes a processor 1002 (e.g., a CPU, a graphics processing unit (GPU), or both), a main memory 1004 and a static memory 1006, which communicate with each other via a bus 1008. The computer system 1000 can further include a video display 1010 (e.g., a liquid crystal display (LCD) or a cathode ray tube (CRT)). The computer system 1000 also includes an alphanumeric input device 1012 (e.g., a keyboard or a touch-sensitive display screen), a cursor control device 1014 (e.g., a mouse), a storage unit 1016, a signal generation device 1018 (e.g., a speaker), and a network interface device 1020.

Machine-Readable Medium

The storage unit 1016 includes a machine-readable medium 1022 on which is stored one or more sets of instructions 1024 (e.g., software) embodying or utilized by any one or more of the methodologies or functions described herein. The instructions 1024 can also reside, completely or at least partially, within the main memory 1004 and/or within the processor 1002 during execution thereof by the computer system 1000, the main memory 1004 and the processor 1002 also constituting machine-readable media 1022.

While the machine-readable medium 1022 is shown, in an example embodiment, to be a single medium, the term "machine-readable medium" can include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory including, by way of example, semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 can further be transmitted or received over a communications network 1026 using a transmission medium. The instructions 1024 can be transmitted using the network interface device 1020 and any one of a number of well-known transfer protocols (e.g., HTTP). Examples of communication networks 1026 include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
retrieving, from a member database, a skills vector corresponding to a first member of a social networking service, the skills vector indicating, for each of a first plurality of skills, a skill value indicating a measure of proficiency of the first member in the corresponding skill;

retrieving, from a jobs database, one or more requirements for a first job opening corresponding to a first job listing;

obtaining information about a plurality of courses available to take, the information including, for each of the plurality of courses, time involved in taking the corresponding course and a course vector including, for each of a second plurality of skills, an effect on one or more skills of taking the corresponding course;

obtaining member profiles of members who have previously successfully applied for a job corresponding to the first job opening;

passing the member profiles to a negative difference applier, the negative difference applier outputting modified user profiles, the modified user profiles having been reverted to a previous state representing a state at the time the respective members successfully applied for the job;

training a machine learning algorithm to learn weights for member profiles;

aggregating skills identified in the modified user profiles using the weights learned by the machine learning algorithm to generate the skills vector for the hypothetical member for the first job opening based on metadata;

generating, by the hardware processor, a first proximity score for the first member, the first proximity score indicating a vector distance between the skills vector of the first member and the skills vector of the hypothetical member for the first job opening;

generating, by the hardware processor, a plurality of hypothetical skills vectors for the first member by combining the skills vector for the first member and the course vectors for each of the plurality of courses;

calculating a second proximity score of each of the plurality of courses, the second proximity score indicating a vector distance between the hypothetical skills vector of the first member for the corresponding course and the skills vector of the hypothetical member for the first job opening;

using a subset selection algorithm to select an optimal combination of courses selected from the plurality of courses, based on minimizing time while simultaneously maximizing the difference between the second proximity score for each course in the plurality of courses and the first proximity score for the first member.

2. The computer-implemented method of claim 1, wherein the course information is specified by a course creator.

3. The computer-implemented method of claim 2, further comprising:
providing the course creator with information about course information for other courses that are related to the course.

4. The computer-implemented method of claim 3, wherein the courses that are related to the course are determined via a similarity matching algorithm based on keywords in course descriptions.

5. The computer-implemented method of claim 2, further comprising:
providing the course creator with information about actual job placement results of members who took courses that are related to the course.

6. The computer-implemented method of claim 1, wherein the subset selection algorithm is a particle swarm optimization (PSO)-based evolutionary algorithm.

7. The computer-implemented method of claim 6, wherein the machine learning algorithm dynamically alters the weights based on feedback of success or failure of candidates applying for the first job opening.

8. The computer-implemented method of claim 1, wherein the obtaining information about a plurality of courses includes using an information retrieval approach by computing a skills gap by determining missing skills for a member/job pair, forming a set of queries by combining pairs of related missing skills, and posing the set of queries to a search engine to receive course information.

9. A system comprising:
a member database storing member profiles of members of a social networking service;
a computer-readable medium having instructions stored thereon, which, when executed by a processor of a course evaluator, cause the system to:
retrieve, from a member database, a skills vector corresponding to a first member of a social networking service, the skills vector indicating, for each of a first plurality of skills, a skill value indicating a measure of proficiency of the first member in the corresponding skill;
retrieve, from a jobs database, one or more requirements for a first job opening corresponding to a first job listing;
obtain information about a plurality of courses available to take, the information including, for each of the plurality of courses, time involved in taking the corresponding course and a course vector including, for each of a second plurality of skills, an effect on one or more skills of taking the corresponding course;
obtain member profiles of members who have previously successfully applied for a job corresponding to the first job opening;
pass the member profiles to a negative difference applier, the negative difference applier outputting modified user profiles, the modified user profiles having been reverted to a previous state representing a state at the time the respective members successfully applied for the job;
train a machine learning algorithm to learn weights for member profiles;
aggregate skills identified in the modified user profiles using the weights learned by the machine learning algorithm to generate the skills vector for the hypothetical member for the first job opening based on metadata;
generate, by the hardware processor, a first proximity score for the first member, the first proximity score indicating a vector distance between the skills vector of the first member and the skills vector of the hypothetical member for the first job opening;
generate, by the hardware processor, a plurality of hypothetical skills vectors for the first member by combining the skills vector for the first member and the course vectors for each of the plurality of courses;
calculate a second proximity score of each of the plurality of courses, the second proximity score indicating a vector distance between the hypothetical skills vector of the first member for the corresponding course and the skills vector of the hypothetical member for the first job opening;
use a subset selection algorithm to select an optimal combination of courses selected from the plurality of courses, based on minimizing time while simultaneously maximizing the difference between the second proximity score for each course in the plurality of courses and the first proximity score for the first member.

10. The system of claim 9, wherein the course information is specified by a course creator.

11. The system of claim 10, the computer-readable medium further having instructions stored thereon, which, when executed by a processor of the course evaluator, cause the system to:
provide the course creator with information about course information for other courses that are related to the course.

12. The system of claim 11, wherein the courses that are related to the course are determined via a similarity matching algorithm based on keywords in course descriptions.

13. The system of claim 10, the computer-readable medium further having instructions stored thereon, which, when executed by a processor of the course evaluator, cause the system to:
provide the course creator with information about actual job placement results of members who took courses that are related to the course.

14. The system of claim 9, wherein the subset selection algorithm is a particle swarm optimization (PSO)-based evolutionary algorithm.

15. A non-transitory machine-readable storage medium having instruction data to cause a machine to perform the following operations:
retrieving, from a member database, a skills vector corresponding to a first member of a social networking service, the skills vector indicating, for each of a first plurality of skills, a skill value indicating a measure of proficiency of the first member in the corresponding skill;
retrieving, from a jobs database, one or more requirements for a first job opening corresponding to a first job listing;
obtaining information about a plurality of courses available to take, the information including, for each of the plurality of courses, time involved in taking the corresponding course and a course vector including, for each of a second plurality of skills, an effect on one or more skills of taking the corresponding course;
obtaining member profiles of members who have previously successfully applied for a job corresponding to the first job opening;
passing the member profiles to a negative difference applier, the negative difference applier outputting modified user profiles, the modified user profiles having been reverted to a previous state representing a state at the time the respective members successfully applied for the job;
training a machine learning algorithm to learn weights for member profiles;
aggregating skills identified in the modified user profiles using the weights learned by the machine learning algorithm to generate the skills vector for the hypothetical member for the first job opening based on metadata;
generating, by the hardware processor, a first proximity score for the first member, the first proximity score indicating a vector distance between the skills vector of the first member and the skills vector of the hypothetical member for the first job opening;
generating, by the hardware processor, a plurality of hypothetical skills vectors for the first member by combining the skills vector for the first member and the course vectors for each of the plurality of courses;
calculating a second proximity score of each of the plurality of courses, the second proximity score indicating a vector distance between the hypothetical skills vector of the first member for the corresponding course and the skills vector of the hypothetical member for the first job opening;
using a subset selection algorithm to select an optimal combination of courses selected from the plurality of courses, based on minimizing time while simultaneously maximizing the difference between the second proximity score for each course in the plurality of courses and the first proximity score for the first member.

16. The non-transitory machine-readable storage medium of claim 15, wherein the course information is specified by a course creator.

17. The non-transitory machine-readable storage medium of claim 16, the operations further comprising:
providing the course creator with information about course information for other courses that are related to the course.

18. The non-transitory machine-readable storage medium of claim 16, the operations further comprising:
providing the course creator with information about actual job placement results of members who took courses that are related to the course.

19. The non-transitory machine-readable storage medium of claim 15, wherein the subset selection algorithm is a particle swarm optimization (PSO)-based evolutionary algorithm.

20. The non-transitory machine-readable storage medium of claim 19, wherein the machine learning algorithm dynamically alters the weights based on feedback of success or failure of candidates applying for the first job opening.

* * * * *